UNITED STATES PATENT OFFICE.

GEORGE MATHEW ROSE, OF FARGO, (DAKOTA TERRITORY,) NORTH DAKOTA, ASSIGNOR TO MYRA BEALES ROSE, OF SAME PLACE.

PROCESS OF DISINTEGRATING FIBROUS SUBSTANCES.

SPECIFICATION forming part of Letters Patent No. 429,647, dated June 10, 1890.

Application filed February 29, 1888. Serial No. 265,681. (No specimens.)

*To all whom it may concern:*

Be it known that I, GEORGE MATHEW ROSE, a subject of the Queen of Great Britain, now residing at Fargo, in the county of Cass and State of North Dakota, have invented a certain new and useful Process of Disintegrating Fibrous Substances, which is fully set forth in the following specification.

The object of my invention is to obtain a fiber something like that obtained from flax or other like material, and suitable for the manufacture of cord, twine, thread, or fabrics produced by using such thread in any of the ordinary modes of manufacturing textile fabrics.

The improvement relates to the treatment of certain vegetable growths, which are now found growing wild and are looked upon as wild weeds, having no utility whatever. The plants here referred to are known under botanical names as follows: *Iva xanthifolia, Cannabis sativa, Solidago Canadensis, Helianthus rigidus, Heliopsis scabra, Amaranthus retroflexus, Ambrosia artemesiæfolia,* and some other plants possessing similar characteristics as those mentioned above, but which it is not necessary to catalogue here, those named being the principal ones. The purpose of my process is to treat these plants chemically in a green state and obtain the fiber by separating therefrom all other material without any previous process of retting, drying, or curing.

In the practical application of my invention the plants mentioned above, or any of them, when about at full growth, but preferably before passing maturity, are gathered, and while in a green uncured condition are partially crushed, which is accomplished by subjecting them to the operation of two or more pairs of rolls, which may be made of metal, wood, rubber, or any other suitable material. For the purpose of straightening out the fibrous material of the plants the rolls are made with each successive pair increased in diameter, so that their surface speed will be slightly greater than that of the pair immediately preceding, thereby providing for a strain or pull upon the material, which will tend to straighten out the fibers. In this crushing operation the plants are not to be mashed with great pressure by the rolls running closely together; but only so much pressure should be applied as to break down and split up the stalks without pressing or squeezing the material with any such force as is used where the weed is to express the juices. Other devices may be used in the place of rolls—such as beaters—constructed to operate upon the principle of steam-hammers, the particular mechanism for this purpose being no part of the invention. Rolls are preferred, however, and when used it is desirable that they be heated by steam or any other suitable way. If steam is used, it should be about eighty pounds pressure. This heating of the rollers assists in the disintegration of the vegetable material. The plants thus crushed or opened I then submit to the action of a chemical bath, which is prepared as follows: Oxychloride of calcium, potassium hydroxide, ammonium carbonate, and magnesium sulphate, in equal parts, by weight, are dissolved in water to form a substantially-saturated solution. Instead of potassium, hydroxide bichromate of potassium may be substituted, and under certain conditions the proportions must be varied slightly, this variation depending upon the age of the plants, or certain kinds of the plants specified. In case the plants are well along in growth, the ammonium and potassium should be increased and the magnesium decreased, the reason being that the woody part of the vegetable growth is harder under the condition named, and consequently requires a greater proportion of the chemicals intended to act upon it, and the same rule applies to the different plants, those containing the greater proportion of woody substance requiring the greater proportion of the chemicals named. In some instances, particularly with old plants, it may be desirable to use two or more of these chemical baths, immersing the vegetable material first in one for a certain period, then removing it and placing it in a new fresh bath, and, if necessary, repeating this step for a third bath, or even more, this treatment in the chemical baths being controlled by the time required to obtain the necessary chemical action upon the vegetable matter to remove from it all material except the fibrous structure of the plants. Usually the vegetable matter must be subjected to the action of these chemical baths for about four hours, more or less, according to the age and condition of the plants. All the baths are to be of the same composition as above specified for the first, and all, including the first, should be used at a temperature of about 200° Fahrenheit. It is then removed from the chemical bath and placed in a bath of hot water at a temperature of 200° Fahrenheit, in which hot-water bath it is kept for about two hours; and in case the proportion of magnesium has been considerably reduced in the preceding chemical baths, it should be restored by putting it in this hot-water bath, the action of the magnesium being to properly set the fiber. After lying in the hot-water bath for about two hours the material is removed and subjected to a cold-water bath for about fifteen minutes to set the texture of the fibrous material. The action of the chemical and hot-water baths is to destroy and wash out all material from the plants, except the fibrous structure, and this alone remains when it is removed from the hot bath. After its subjection to the cold-water bath mentioned above this fiber is drained until it is nearly dry. I then pass it through one or more pairs of rolls with plane surfaces and of equal diameters, which lay the damp material and produce a sliver ready for the operation of breaking, scutching, or cleaning.

Breaking is required only in case of old plants for the purpose of removing the woody material, and the scutching or cleaning process is for the same purpose as with other fibrous material and may be performed by any usual machinery for this purpose.

The entire process is intended to be carried on continuously by using mechanical appliances adapted to carry the material from one step to another, so that when the plants leave the crushing rolls or hammers they are taken at once by an elevator, cradle, or other suitable carrier and conveyed to the chemical tanks. Then the material is lifted from one tank to another, if more than one is used, and finally to the hot and cold water tanks successively, and finally to the draining receptacle.

As I have stated above, I prefer to take the plants when green; but they may be successfully treated, even when dried, by changing the proportions of the chemicals, as already suggested, and under this condition it will be better, perhaps, to leave the potassium out of the chemical baths altogether, the remaining three mentioned chemicals being used in equal parts. The gums, &c., are removed in these baths, and the woody material is partly removed and left in such condition that the fiber is readily freed from it by the usual process of breaking and scutching. In some instances the gums, &c., taken from the plants and retained in the baths are of value, and in such case these substances may be recovered for uses to which they may be adapted.

The fiber which I obtain from the plants named by the process described above is strong and all good length, and may be used in place of flax, hemp, manila, or other like fiber, but at considerably less expense.

The mechanical appliances by which my process is carried out constitute no part of the present invention. They may be of any construction and organization suited to the purpose, and it is not essential to the invention that the process should be carried on from one step to another by mechanical means acting successively and continuously. Any way by which the material may be submitted to the successive operations named may be adopted for the carrying out of my process.

Having thus described my invention, what I claim as new, and desire to secure by Letters Patent, is—

The herein-described process for obtaining fiber from vegetable growths, the same consisting in first partially crushing or opening the plants by rolls or other suitable devices, then submitting the crushed material to the action of a chemical bath or baths, consisting of a saturated solution of oxychloride of calcium, potassium hydroxide, ammonium carbonate, and magnesium sulphate, in equal parts, by weight, and heated to about 200° Fahrenheit, then to a bath of hot water, then to a bath of cold water, and then, partially drying the fiber and passing it through smooth-faced rolls, substantially as and for the purposes specified.

GEORGE MATHEW ROSE.

Witnesses:
J. W. WOODHULL,
JAMES B. CULL.